US008726180B2

(12) United States Patent
Sugano et al.

(10) Patent No.: US 8,726,180 B2
(45) Date of Patent: May 13, 2014

(54) INFORMATION PROCESSING DEVICE, INFORMATION PROCESSING METHOD, CONTENT TRANSFER SYSTEM AND COMPUTER PROGRAM

(75) Inventors: Ayumu Sugano, Kanagawa (JP); Kumiko Sasaki, Kanagawa (JP); Toshihiro Morita, Kanagawa (JP); Atsuo Ukigaya, Chiba (JP)

(73) Assignee: Sony Corporation, Tokyo (JP)

( * ) Notice: Subject to any disclaimer, the term of this patent is extended or adjusted under 35 U.S.C. 154(b) by 514 days.

(21) Appl. No.: 12/327,954

(22) Filed: Dec. 4, 2008

(65) Prior Publication Data
US 2009/0172579 A1    Jul. 2, 2009

(30) Foreign Application Priority Data

Dec. 27, 2007    (JP) ................. 2007-337467

(51) Int. Cl.
*G06F 3/048*    (2013.01)
*G06F 3/00*    (2006.01)
(52) U.S. Cl.
USPC ............................. 715/769; 715/744; 715/783
(58) Field of Classification Search
USPC .......................................................... 715/769
See application file for complete search history.

(56) References Cited

U.S. PATENT DOCUMENTS

| 6,745,199 | B2 | 6/2004 | Morita et al. |
| 7,296,025 | B2 * | 11/2007 | Kung et al. ................... 707/608 |
| 7,788,582 | B2 * | 8/2010 | Robbin et al. ................ 715/716 |
| 2005/0028204 | A1 | 2/2005 | Nakamura et al. |
| 2005/0198582 | A1 * | 9/2005 | Hennum et al. .............. 715/772 |
| 2006/0240856 | A1 | 10/2006 | Counts et al. |
| 2007/0143340 | A1 | 6/2007 | Lee et al. |

FOREIGN PATENT DOCUMENTS

| JP | 2002-116933 | 4/2002 |
| JP | 2003-150611 | 5/2003 |
| JP | 2004-13575 | 1/2004 |
| JP | 2005-51500 | 2/2005 |
| JP | 2007-28252 | 2/2007 |
| JP | 2007-47959 | 2/2007 |
| JP | 2007-109200 | 4/2007 |

OTHER PUBLICATIONS

Miser, Absolute Beginner's Guide to iPod and iTunes, Dec. 21, 2006, Que, Third Edition, 218, 232, 237, 275, 280-81, 283, 291 301.*

(Continued)

*Primary Examiner* — Boris Pesin
*Assistant Examiner* — Matthew Ell
(74) *Attorney, Agent, or Firm* — Oblon, Spivak, McClelland, Maier & Neustadt, L.L.P.

(57) ABSTRACT

An information processing device is provided that performs content transfer with a content recording device on which is stored content that has content identification information identifying the content. The information processing device includes: an identification information acquisition portion that acquires, from the content recording device, the content identification information for the content recorded in the content recording device; a display control portion that groups a list of the content identification information acquired by the identification information acquisition portion for each of a content type acquired from the content identification information and displays the list; and a sort control portion that sorts, for each of the content types, the list of the content identification information displayed by the display control portion, based on the content attribute information acquired from the content identification information.

11 Claims, 15 Drawing Sheets

(56) References Cited

OTHER PUBLICATIONS

Seokhyang Cho, et al. "Secure Mobile Content Delivery Using Dynamic Group Key Agreement With Batch Verification" ICCSA 2007, LNCS vol. 4706, Part II, Aug. 26, 2007, pp. 996-1007.

Japanese Office Action issued Dec. 13, 2011, in Patent Application No. 2007-337467.

Japanese Office Action issued Mar. 27, 2012, in Patent Application No. 2007-337467 (with English-language translation).

Toshikazu Murakami, "iPod+iTunes" for Windows & Macintosh Thoroughgoing Utilizable Manual (First Edition), Media Tech Publishing Corporation (Satoshi Inoue), Apr. 8, 2004, First edition, pp. 100-102 (with cover pages).

Japanese Office Action issued Apr. 2, 2013 in Patent Application No. 2007-337467 with English Translation.

Japanese Decision to Dismiss the Amendment issued Jul. 24, 2012 in Japanese Application No. 2007-337467 (with English translation).

Japanese Decision of Refusal issued Jul. 24, 2012 in Japanese Application No. 2007-337467 (with English translation).

Shunichi Murakami, [iPod+iTunes] for Win & Mac, Perfect Use of Manual, Original Version, Media Tech Inc Publication, Satoshi Inoue, Apr. 4, 2004, First Version, p. 100-102.

\* cited by examiner

FIG.12

| | | TITLE | ARTIST | SIZE | TIME |
|---|---|---|---|---|---|
| ▼ MUSIC | | | | | |
| | ▶ | People Line | | | |
| | ▶ | Pizza Mix | | | |
| | ▼ | Paint It Blue | | | |
| | | 001 Paint It Blue | Slimboys | 3.8MB | 3:01 |
| | ▼ | BEST OF STOP 1999 - | | | |
| | | 001 KIMI TO NO OMOIDE | STOP | 4.1MB | 4:45 |
| | | 002 SORA GA TOBETARA | STOP | 3.9MB | 3:38 |
| | | 003 BLUE BICYCLE | STOP | 3.8MB | 3:31 |
| | | 004 SNAKE | STOP | 4.3MB | 5:02 |
| | | 005 NAMIDA GA CHIRARI | STOP | 4.9MB | 4:23 |
| ▼ VIDEO | | | | | |
| | ▼ 🎞 | SUMMER RIDER | | 132.5MB | 1:52:16 |
| | | 📄 FILE 1/5 | | 23.2MB | 24:18 |
| | | 📄 FILE 2/5 | | 26.8MB | 28:12 |
| | | 📄 FILE 3/5 | | 20.4MB | 21:36 |
| | | 📄 FILE 4/5 | | 22.1MB | 23:47 |
| ▼ PLAYLIST | | | | | |
| 📄 | | MISCELLANEOUS PLAYLIST | | 0.1MB | 54:34 |

139, 138

INFORMATION PROCESSING DEVICE, INFORMATION PROCESSING METHOD, CONTENT TRANSFER SYSTEM AND COMPUTER PROGRAM

CROSS REFERENCES TO RELATED APPLICATION(S)

The present invention contains subject matter related to Japanese Patent Application JP 2007-337467 filed in the Japan Patent Office on Dec. 27, 2007, the entire contents of which being incorporated herein by reference.

BACKGROUND OF THE INVENTION

1. Field of the Invention

The present invention relates to an information processing device, an information processing method, a content transfer system and a computer program. More specifically, the present invention relates to an information processing device, an information processing method, a content transfer system and a computer program that allow stored content to be efficiently searched and found.

2. Description of the Related Art

Text files, image files, music files and so on that are stored in an image processing device, such as a personal computer and the like, are often arranged by the user of the information processing device in a layered structure for ease of classification. For example, the user sets up a folder to store text files, a folder to store image files, and a folder to store music files and so on. Inside the folders, more folders are created with a further layered structure, and the files are stored inside the created folders, for ease of data management.

When playing back files in which music and images (hereinafter sometimes collectively referred to as "content" or "contents") are recorded and stored using this type of layered structure, a so-called jukebox program application is very often used. In a jukebox program, a table of contents is displayed on the screen. The contents can be displayed according to each content type (e.g. by music type, or by image type), and the display can be narrowed down to contents belonging to a specific artist, album or genre.

Further, content transfer systems are recently becoming widespread. When an information processing device is connected to a compact mobile terminal, the content transfer system is used to transfer content between the mobile terminal and the information processing device. The content transfer system uses the jukebox program to transfer the content, and the jukebox program can display the contents stored in the mobile terminal as well as the contents stored in the information processing device. The jukebox program can be used to newly transfer contents to the mobile terminal, to delete contents stored in the mobile terminal and the like.

SUMMARY OF THE INVENTION

However, in known art, the jukebox program can only display contents by individual type. In other words, a table of contents can only be displayed by music, by image and so on. Programs do exist where a plurality of contents are displayed in a state in which the content types are mixed. However, when a table of contents is displayed in this type of program, if, for example, the contents are sorted by title, the sorting by title is performed in a state in which the plurality of content types are mixed, and sorting cannot be performed by content type.

Here, the present invention addresses the problem described above and provides a new and improved information processing device, information processing system, content transfer system and computer program that allow a table of contents to be displayed by each content type when contents belonging to a plurality of content types are simultaneously displayed, and allow the content list to be sorted by each content type, thus allowing contents stored in a device to be efficiently searched and found.

According to an embodiment of the present invention, there is provided an information processing device that performs content transfer with a content recording device on which is recorded content that has content identification information identifying the content. The information processing device includes: an identification information acquisition portion that acquires, from the content recording device, the content identification information for the content recorded in the content recording device; a display control portion that groups a list of the content identification information acquired by the identification information acquisition portion for each of a content type acquired from the content identification information and displays the list; and a sort control portion that sorts, for each of the content types, the list of the content identification information displayed by the display control portion, based on the content attribute information acquired from the content identification information.

According to this configuration, the identification information acquisition portion acquires, from the content recording device, content identification information for the content recorded in the content recording device, and the display control portion groups the list of content identification information acquired by the identification information acquisition portion for each of a content type acquired from the content identification information and displays the list. Then, the sort control portion, for each of the content types on the content identification information list displayed by the display control portion, performs sorting based on content attribute information acquired from the content identification information. As a result, when simultaneously displaying content belonging to a plurality of content types, the content is displayed as a table separated according to content type and sorting of the table of contents can be performed by content type, thus allowing the content stored in the content recording device to be efficiently searched and found.

The above-described information processing device further includes a content recording portion on which is recorded content that has content identification information. The display control portion may display the list of content recorded on the content recording portion for each of the content types acquired from the content identification information. In this configuration, the display control portion acquires content identification information from the content recording portion on which is recorded content that has content identification information, groups the list according to each of a content type acquired from the content identification information and displays the list. As a result, when simultaneously displaying content belonging to a plurality of content types, the content is displayed as a table separated according to content type and sorting of the table of contents can be performed by content type, thus allowing the content stored in the information processing device to be efficiently searched and found.

The sort control portion receives device identification information from the content recording device, and based on the device identification information, may determine whether to perform one of sorting the content identification information list for each content type, and performing sorting of all of the content. Moreover, the display control portion may receive the device identification information from the content recording device and determine the contents of the display for each content type based on the device identification information. According to this configuration, the display control portion determines the contents of the display for each content type based on the device identification information received from the content recording device. As a result, it can be determined whether or not to display the table of contents according to each content type depending on the type of content recording device.

The display control portion may display content for which the attribute information is the same in groups of attribute information, for at least one of the content types. In this configuration, the display control portion displays content for which the attribute information is the same in groups of attribute information, for at least one of the content types. As a result, by grouping the content belonging to the same attribute information in groups of the attribute information, the content can be easily ascertained.

A display order of the list for each content type displayed by the display control portion may be changed by a drag and drop operation. Moreover, the sort control portion, when designating content attribute information that is not shared and sorting the content identification information list, may sort the content identification information list using other content attribute information for any content type that does not have the unshared content attribute information. The display control portion may also instantly display only a list of the content identification information that matches specified conditions.

According to another embodiment of the present invention, there is provided an information processing device that includes: a content recording portion that records content that has content identification information identifying the content, content type information and at least one attribute information; a display control portion that groups a list of the content identification information recorded in the content recording portion for each of a content type and displays the list; and a sort control portion that sorts, for each of the content types, the list of content identification information displayed by the display control portion, based on content attribute information acquired from the content identification information.

With this configuration, the content recording portion records content that has content identification information identifying the content, content type information and at least one content attribute, and the display control portion groups the list of content identification information recorded in the content recording portion for each of the content types and displays the list. Then the sort control portion sorts the list of content identification information displayed by the display control portion, for each of the content types, based on the content attribute information acquired from the content identification information recorded in the content recording portion. As a result, when simultaneously displaying content belonging to a plurality of content types, the content is displayed as a table separated according to content type, and sorting of the table of contents can be performed by content type, thus allowing the content stored in the information processing device to be efficiently searched and found.

According to another embodiment of the present invention, there is provided an information processing method that performs content transfer between a content recording device on which is recorded content that has content identification information identifying the content and an information processing device, the information processing method including the steps of: acquiring, from the content recording device, content identification information for the content recorded in the content recording device; controlling display, by grouping a list of the content identification information list acquired in the identification information acquiring step for each of a content type acquired from the content identification information and displaying the list; and sorting, for each of the content types, the list of content identification information displayed in the controlling display step, based on content attribute information acquired from the content identification information.

According to another embodiment of the present invention, there is provided a content transfer system that includes a content recording device on which is stored content that has content identification information identifying the content, and an information processing device that performs content transfer with the content recording device. The information processing device includes: an identification information acquisition portion that acquires, from the content recording device, the content identification information for the content recorded in the content recording device; a display control portion that groups a list of the content identification information acquired by the identification information acquisition portion for each of a content type acquired from the content identification information and displays the list; and a sort control portion that sorts, for each of the content types, the list of the content identification information displayed by the display control portion, based on content attribute information acquired from the content identification information.

According to another embodiment of the present invention, there is provided a computer program that performs content transfer with a content recording device on which is stored content that has content identification information identifying the content. The computer program includes instructions that command a computer to perform the steps of: acquiring, from the content recording device, content identification information for the content recorded in the content recording device; controlling display, by grouping a list of the content identification information list acquired in the identification information acquiring step for each of a content type acquired from the content identification information and displaying the list; and sorting, for each of the content types, the content identification information list displayed in the controlling display step, based on content attribute information acquired from the content identification information.

According to the present invention as explained above, a new and improved information processing device, information processing method, content transfer system and computer program are provided that, when simultaneously displaying content that belongs to a plurality of content types, allow the content to be displayed by each of the content types, and the table of contents to be sorted by each of the content types.

BRIEF DESCRIPTION OF THE DRAWINGS

FIG. 12 is an explanatory diagram showing another modified example of the jukebox program according to the first embodiment of the present invention;

DETAILED DESCRIPTION OF THE PREFERRED EMBODIMENTS

Figure 1:
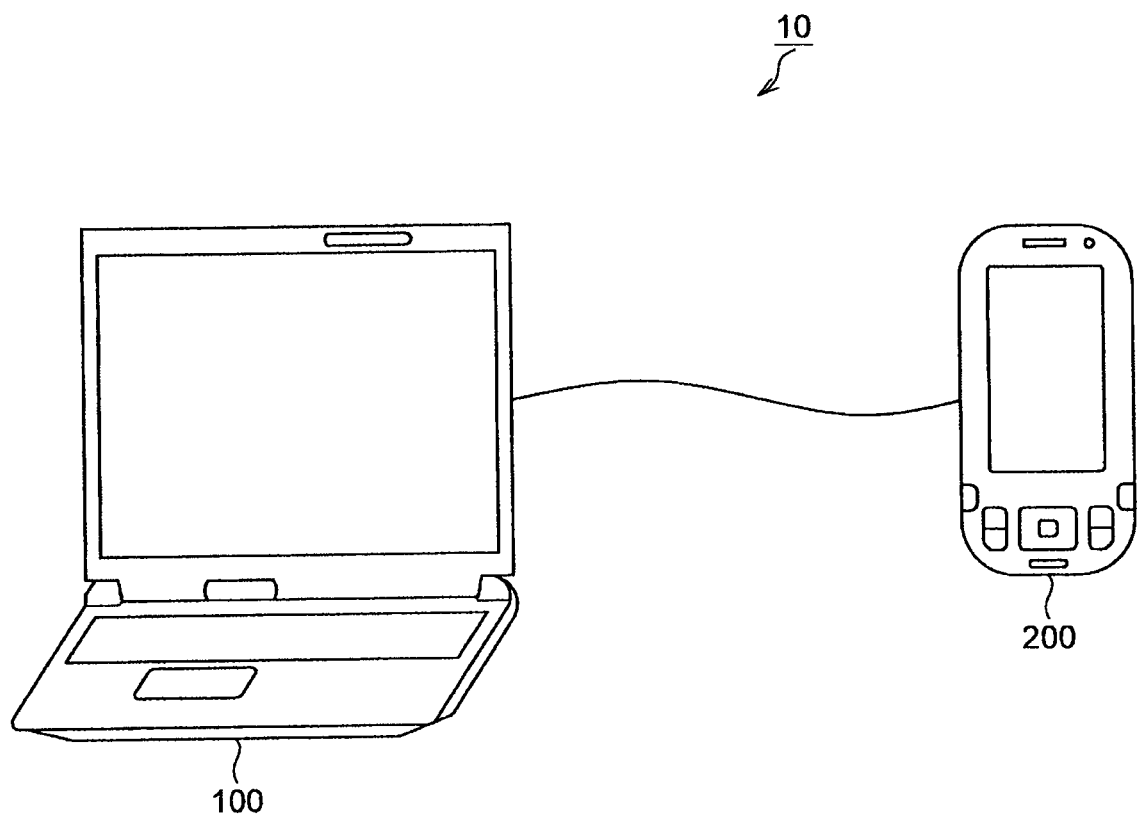
FIG. 1 is an explanatory diagram illustrating a content transfer system 10 according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, a content transfer system according to a first embodiment of the present invention will be explained. FIG. 1 is an explanatory diagram illustrating a content transfer system 10 according to the first embodiment of the present invention. Hereinafter, the content transfer system 10 according to the first embodiment of the present invention will be explained with reference to FIG. 1.

As shown in FIG. 1, the content transfer system 10 according to the first embodiment of the present invention includes an information processing device 100 and a mobile terminal 200. The content transfer system 10 shown in FIG. 1 is a system that transfers contents between the information processing device 100 and the mobile terminal 200. For example, the content transfer system 10 can transfer a piece of music read into the information processing device 100 from a compact disc (CD) to the mobile terminal 200 and can back up a piece of music downloaded into the mobile terminal 200 from a music provider or the like via a communications network onto the information processing device 100. The information processing device 100 and the mobile terminal 200 can be connected using a universal serial bus (USB) cable, an IEEE1394 compliant cable or the like.

The information processing device 100 is a device that internally stores and uses a variety of information, such as a personal computer (PC) for example. In the present embodiment, the information processing device 100 performs content transfer between the information processing device 100 and the mobile terminal 200, and manages content recorded from the information processing device 100 to the mobile terminal 200 (e.g. the editing and deleting of content and so on). The internal structure of the information processing device 100 will be explained in more detail later.

The mobile terminal 200 is a compact terminal for portable use, such as a mobile telephone, a mobile game console, or a mobile music playback device, for example. In the present embodiment, the mobile terminal 200 is explained using an example of a mobile telephone. The internal structure of the mobile terminal 200 will be explained in more detail later.

The content transfer system 10 according to the first embodiment of the present invention is explained above. Next, the structure of the information processing device 100 according to the first embodiment of the present invention will be explained.

Figure 2:
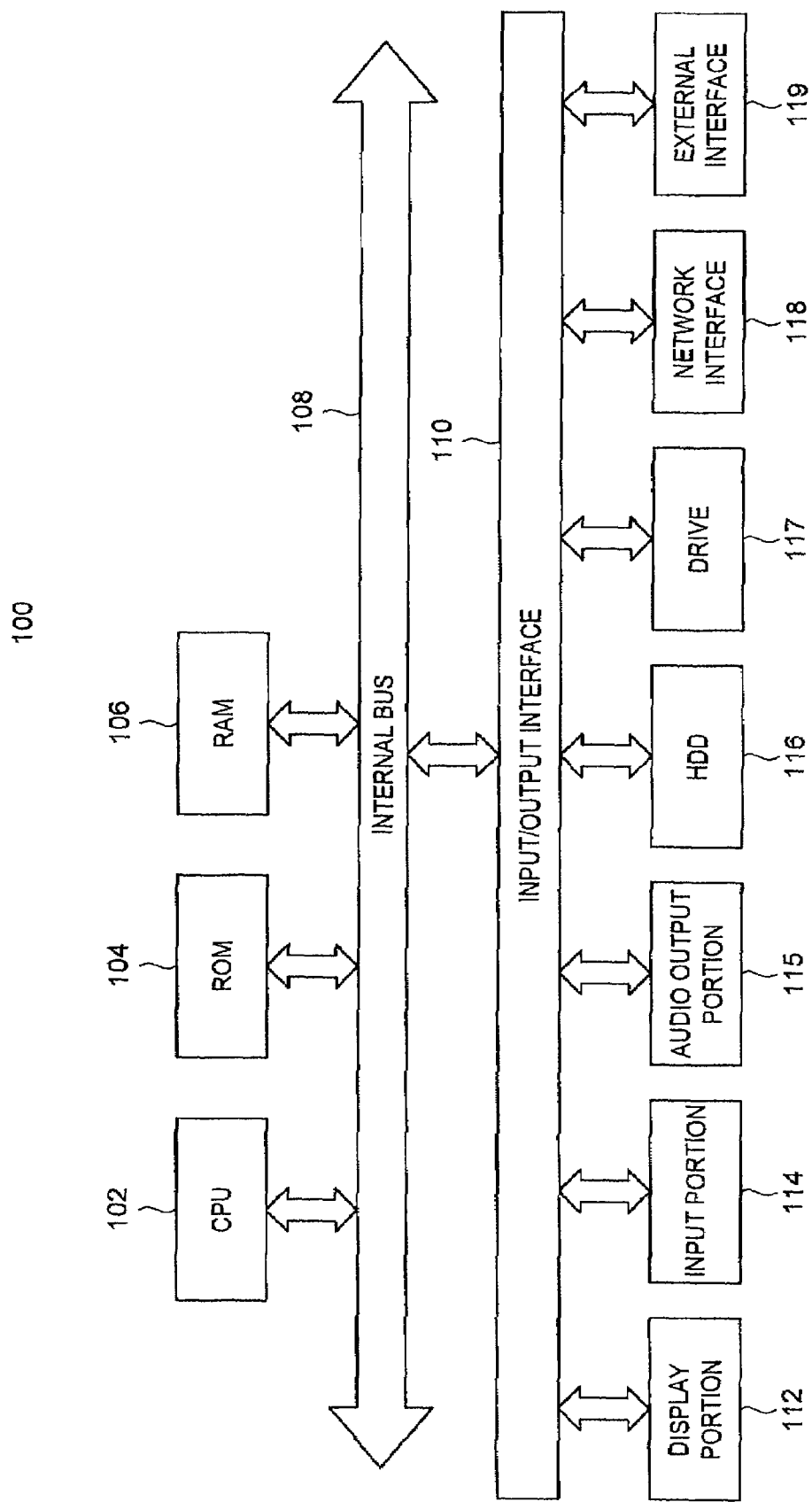
FIG. 2 is an explanatory diagram illustrating a structure of an information processing device 100 according to the first embodiment of the present invention.

FIG. 2 is an explanatory diagram illustrating the structure of the information processing device 100 according to the first embodiment of the present invention. Below, the structure of the information processing device 100 according to the first embodiment of the present invention will be explained with reference to FIG. 2.

As shown in FIG. 2, the information processing device 100 according to the first embodiment of the present invention includes a central processing unit (CPU) 102, a read only memory (ROM) 104, a random access memory (RAM) 106, an internal bus 108, an input/output interface 110, a display portion 112, an input portion 114, an audio output portion 115, a hard disk drive (HDD) 116, a drive 117, a network interface 118 and an external interface 119.

The CPU 102 performs numerical calculations and information processing, and instrument control etc. It performs the numerical calculations, information processing and instrument control by sequentially reading programs stored in the ROM 104 and data stored in the RAM 106, or, for example, based on a signal in response to an instruction input by a user of the information processing device 100 via the input portion 114 or based on a signal transmitted from an external instrument via the network interface 118.

In principle, of the programs and calculation parameters used in the numerical calculation, information processing and instrument control and so on by the CPU 102, the ROM 104 stores fixed data that is not changed. Meanwhile, in principle, of the programs and calculation parameters used in the numerical calculation, information processing and instrument control and so on by the CPU 102, the RAM 106 stores data that changes in accordance with various types of processing.

The internal bus 108 is a path that is used when data is internally exchanged within the information processing device 100. The CPU 102, the ROM 104 and the RAM 106 are all mutually connected by the internal bus 108. The internal bus 108 is also connected to the input/output interface 110, and transfers to the CPU 102 signals in response to instructions transmitted via the input/output interface 110 from the input portion 114 or signals transmitted via the network interface 118 from another device connected to the information processing device 100 by a network.

The input/output interface 110 mediates the input and output transfer of information. The input/output interface 110 is connected to the display portion 112, the input portion 114, the audio output portion 115, the drive 117, the network interface 118 and the external interface 119. The input/output interface 110 is further connected to the internal bus 108, as described above, and transfers to the CPU 102 via the internal bus 108 signals in response to instructions input from the input portion 114 or signals transmitted via the network interface 118 from another device connected to the information processing device 100 by a network.

The display portion 112 displays content input from the input portion 114, and information relating to the results of numerical calculations and information processing, instrument control and the like performed by the CPU 102. The display portion 112 is, for example, formed of a liquid crystal display device, an organic EL display device or the like.

The input portion 114 is operated, for example, when the user of the information processing device 100 inputs any type of instruction to the CPU 102. The input portion 114 is, for example, formed of a button, a keyboard, a touch pad or the like.

When a process involving audio output is performed in relation to the information processing device 100, the audio output portion 115 outputs the audio generated by the process. The HDD 116 is provided with an internal hard disk, drives the hard disk, and records and plays back programs and information (e.g. video files) that are read and executed by the CPU 102. The drive 117 is provided with a portable recording medium and performs data transfer between the recording medium and the information processing device 100. The portable recording medium may be, for example, a magnetic disk, an optical disk, a magneto-optical disk, a semiconductor memory or the like, and the drive 117 can use a device that is able to read such types of recording medium.

The network interface 118 performs the transfer of information between the information processing device 100 and another device, for example, the mobile terminal 200, that is connected to the information processing device 100 via a wired or wireless network connection. The external interface 119 mediates the transfer of information between the information processing device 100 and a peripheral device, for example, the mobile terminal 200, that is used when connected to the information processing device 100. The external interface 119 is, for example, formed of a universal serial bus (USB) port or the like.

The hardware structure of the information processing device 100 according to the first embodiment of the present invention is described above. Next, the functional structure of the information processing device 100 according to the first embodiment of the present invention will be explained.

Figure 3:
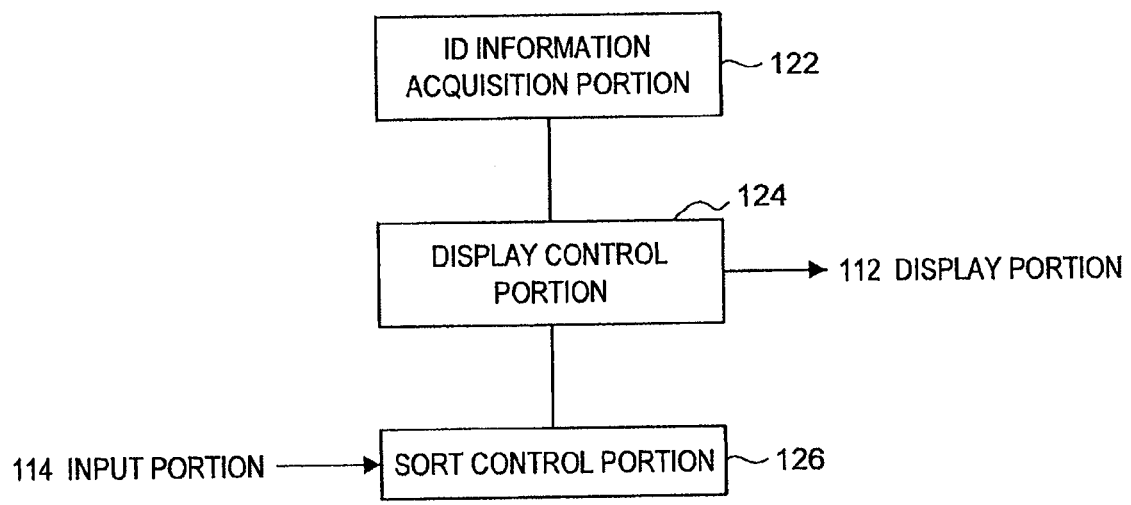
FIG. 3 is an explanatory diagram illustrating a functional structure of the information processing device 100 according to the first embodiment of the present invention.

FIG. 3 is an explanatory diagram illustrating the functional structure of the information processing device 100 according to the first embodiment of the present invention. Hereinafter, the functional structure of the information processing device 100 according to the first embodiment of the present invention will be explained with reference to FIG. 3.

As shown in FIG. 3, the information processing device 100 according to the first embodiment of the present invention includes an identification (ID) information acquisition portion 122, a display control portion 124 and a sort control portion 126.

The ID information acquisition portion 122 acquires content identification information that identifies contents recorded in the information processing device 100 and the mobile terminal 200. The content identification information that identifies the contents is information that serves to distinguish one content from another content, and the content identification information includes various types of content attribute, such as content type, content title, content size, content playback time, the date and time the content was recorded, the content artist, the date and time the content was updated, the content genre, evaluation of contents downloaded by the user and so on.

The display control portion 124 groups a list of content identification information acquired by the ID information acquisition portion 122 according to each content type obtained from the content identification information, and displays the list on the display portion 112. The content types obtained from the content identification information include, for example, music, video, playlists, photographs, electronic books, games, address books and the like.

The sort control portion 126 sorts the content identification information list displayed on the display portion 112 by the display control portion 124 according to each content type, based on content attribute information obtained from the content identification information. The sorting of the content identification information list by the sort control portion 126 may be performed, for example, by operation of the input portion 114 by the user. For example, when the user operates the input portion 114 such that the content identification information list is sorted in descending order of the content title, the sort control portion 126 sorts the content identification information list displayed on the display portion 112 in descending order of the content title, for each content type. The operation will be explained in more specific detail later.

The functional structure of the information processing device 100 according to the first embodiment of the present invention is explained above. Next, the structure of the mobile terminal 200 according to the first embodiment of the present invention will be explained.

Figure 4:
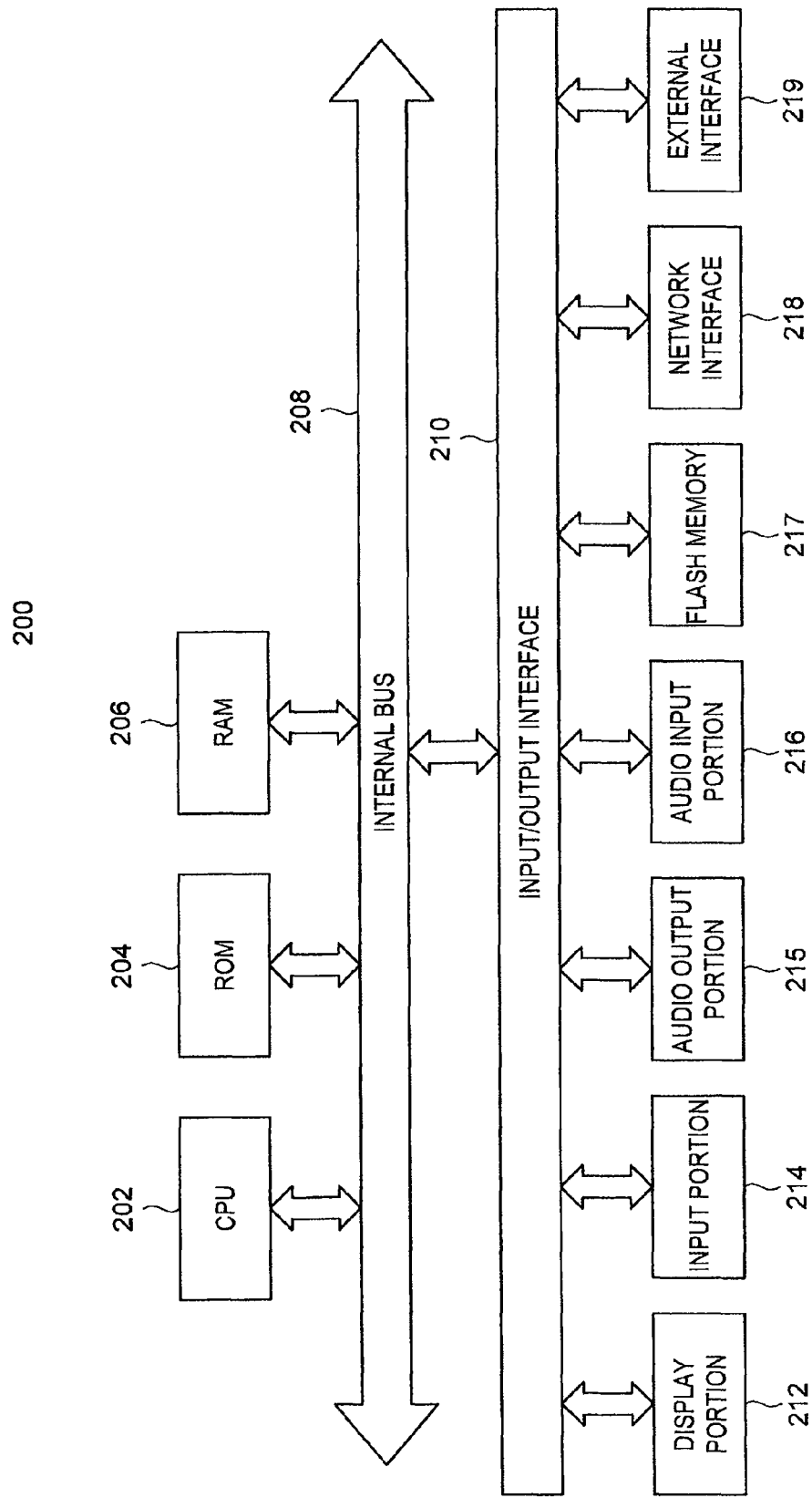
FIG. 4 is an explanatory diagram illustrating a structure of a mobile terminal 200 according to the first embodiment of the present invention.

FIG. 4 is an explanatory diagram illustrating the structure of the mobile terminal 200 according to the first embodiment of the present invention. Hereinafter, the structure of the mobile terminal 200 according to the first embodiment of the present invention will be explained with reference to FIG. 4.

As shown in FIG. 4, the mobile terminal 200 according to the first embodiment of the present invention includes a CPU 202, a ROM 204, a RAM 206, an internal bus 208, an input/output interface 210, a display portion 212, an input portion 214, an audio output portion 215, an audio input portion 216, a flash memory 217, a network interface 218 and an external interface 219.

Here, the CPU 202, the ROM 204, the RAM 206, the internal bus 208, the input/output interface 210, the display portion 212, the input portion 214, the audio output portion 215, the audio input portion 216, the network interface 218 and the external interface 219 have the same functions as the CPU 102, the ROM 104, the RAM 106, the internal bus 108, the input/output interface 110, the display portion 112, the input portion 114, the audio output portion 115, the network interface 118 and the external interface 119 of the information processing device 100 shown in FIG. 2, and a detailed explanation is therefore omitted here. Note that, given the fact that the structural members of the mobile terminal 200 are used in a portable manner, the structural members of the mobile terminal 200 may have some limitations in terms of function in comparison to the structural members of the information processing device 100.

The flash memory 217 is a rewritable memory, and is, in contrast to the RAM 206, a non-volatile memory on which data is not lost when the power source is switched off. The flash memory 217 is therefore suitable for the storage of telephone directory data, emails received by the mobile terminal 200, and content downloaded via a communications network or transferred from the information processing device 100.

Note that, although not shown in FIG. 4, the mobile terminal 200 may be provided with a slot that allows the insertion of a compact recording medium, such as a memory stick (registered trademark). By inserting a compact recording medium in the slot, contents can also be stored in addition to storage on the flash memory 217.

The structure of the mobile terminal 200 according to the first embodiment of the present invention is explained above with reference to FIG. 4. Next, screens displayed on the information processing device 100 for use in the content transfer system 10 according to the first embodiment of the present invention will be explained.

Figure 5:
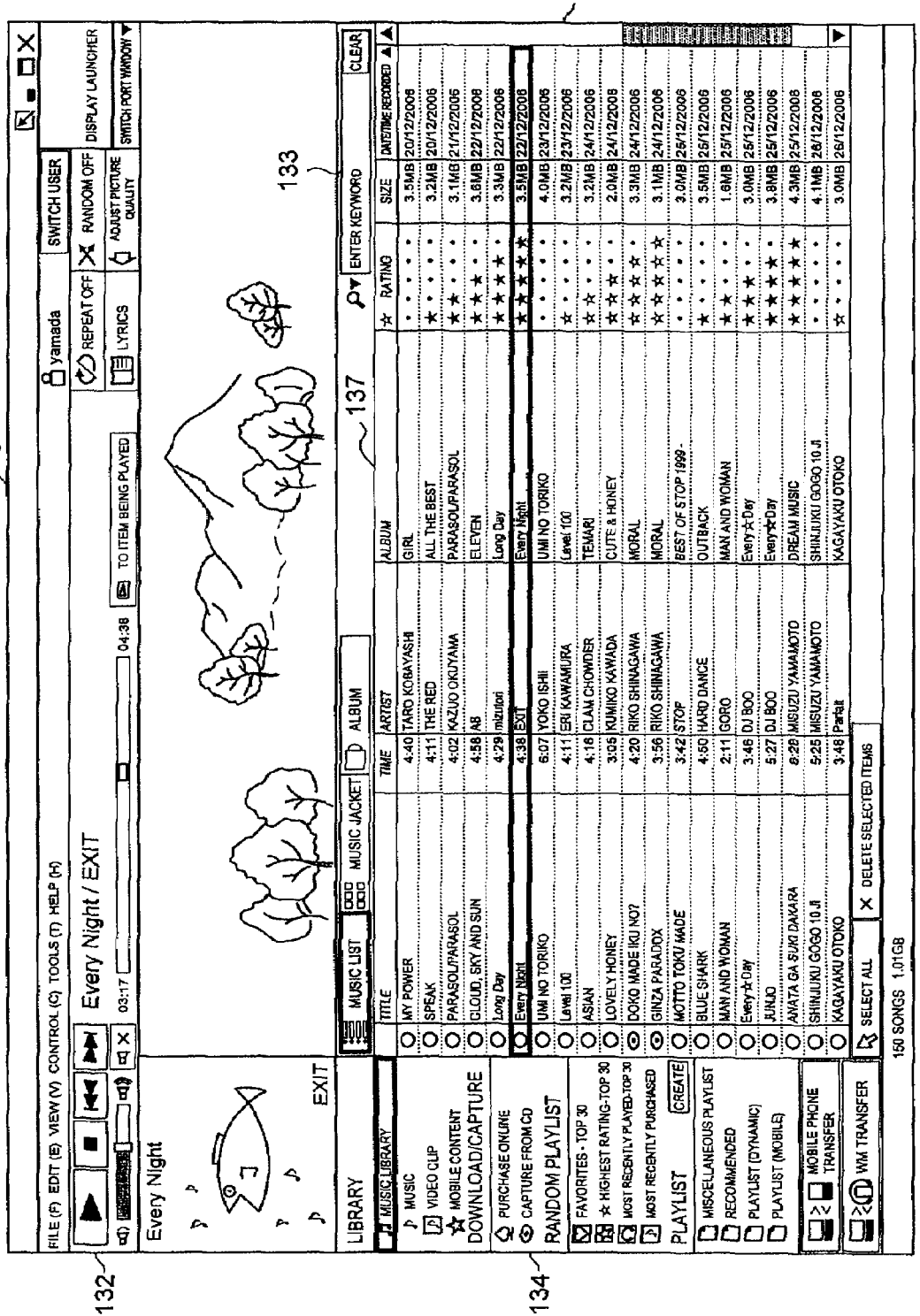
FIG. 5 is an explanatory diagram showing an example of a screen displayed on the information processing device 100.
Figure 6:
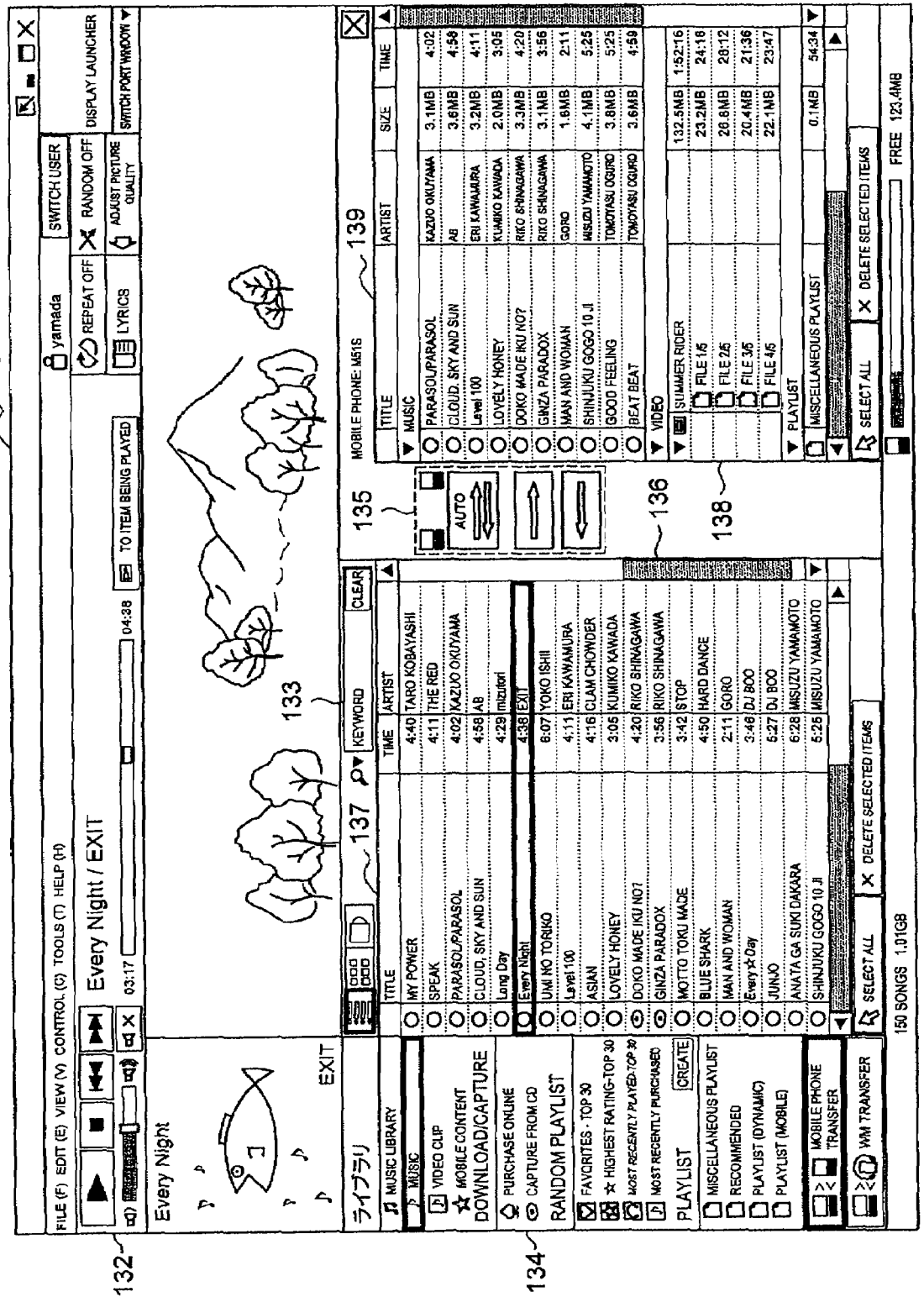
FIG. 6 is an explanatory diagram showing an example of a screen displayed on the information processing device 100.

FIG. 5 and FIG. 6 are explanatory diagrams showing single examples of screens displayed on the information processing device 100 for use in the content transfer system 10 according to the first embodiment of the present invention. Hereinafter, the screens displayed on the information processing device 100 for use in the content transfer system 10 according to the first embodiment of the present invention will be explained with reference to FIG. 5 and FIG. 6.

FIG. 5 shows a screen displayed on the display portion 112 in a case when a jukebox program 130 according to the first embodiment of the present invention is executed on the information processing device 100. The main jukebox program 130 is stored, for example, on the HDD 116, and is executed by loading relevant programs onto the RAM 106 and sequentially executing the programs loaded onto the RAM 106 by the CPU 102. The jukebox program 130 according to the first embodiment of the present invention displays information on the display portion 112, including a content operation portion 132, a side bar 134 and a PC content display portion 136.

In relation to the contents displayed on the PC content display portion 136, the content operation portion 132 instructs content playback, pause, stop, volume adjustment during content playback, adjustment of playback position, skipping of contents, repeat playback, shuffle playback and so on. The jacket of the contents being played back, or images related to the contents being played back and so on may also be displayed on the content operation portion 132.

The side bar 134 switches the contents displayed on the PC content display portion 136, performs content transfer between the information processing device 100 and the mobile terminal 200 and the like. For example, by clicking a mouse or the like to select "Music Library" under the "Library" heading on the side bar, a table of contents is displayed on the PC content display portion 136 relating to the music that can be played on the information processing device 100. By selecting "Music" under the "Music Library" heading, from among the contents relating to music, music files are extracted and displayed on the PC content display portion 136 that are encrypted by a compression method, such as MPEG audio layer-3 (MP3), advanced audio coding (AAC), adaptive transform acoustic coding (ATRAC) and the like. Of course, selection can also be made from the side bar 134 so that all the contents are displayed as a table regardless of type.

The PC content display portion 136 displays a table of the contents that can be played back on the information processing device 100. The display of the table of contents that can be played back on the information processing device 100 is performed by the above-described display control portion 124. The table of contents that is displayed on the PC content display portion 136 is changed by operation of the side bar 134. On the PC content display portion 136, the contents are displayed in a table format according to content attribute information acquired by the ID information acquisition portion 122. The content attribute information may include, for example, the content title, the content playback time, the content artist name, the name of the album containing the content, an evaluation of the content by the user, the content size, the date and time of recording of the content on the information processing device 100, the content genre and so on. The content attribute information is stored internally in the information processing device 100, for example in the HDD 116, in metadata format.

To enable easy identification of which content is being played when content is played back on the jukebox program 130, the content being played back is highlighted on the PC content display portion 136. The title and the artist name for the music being played back are also displayed on the content operation portion 132.

The PC content display portion 136 includes a column header 137. The column header 137 displays the attribute designation for the contents displayed as a table on the PC content display portion 136. In FIG. 5, the content attributes are the title, the time (playback time), the artist name, the album, rating, size and date/time of recording. Of course, attributes other than those shown in FIG. 5 may be displayed in the present invention, and the order of display of the attributes on the column header 137 may be a different order from that shown in FIG. 5. Moreover, the order of display of the attributes displayed in the column header 137 may be sorted by operation of the input portion 114 by the user of the information processing device 100, such as, for example, a drag and drop operation using a mouse.

The user of the information processing device 100 can perform an operation on the column header 137 using the input portion 114 to sort the table of contents. For example, the user can operate a mouse to place the mouse cursor on the column header 137 and click the mouse on the column header 137. The sorting of the table of contents is performed by the above-described sort control portion 126. For example, when the "Title" column on the column header 137 is clicked, the sort control portion 126 detects that the column has been clicked, and sorts the table of contents in ascending order of the titles. If the table of contents is already sorted according to ascending order of the titles, the sort control portion 126 sorts the table of contents in descending order of the titles.

In FIG. 5, the table of contents is displayed on the PC content display portion 136 as text, but the present invention is not limited to this display format. For example, by operation of the operation portion 114 by the user, the table of contents may be displayed in so-called thumbnail format, in which album jacket images of the albums containing the content are displayed. When the table of contents is displayed in thumbnail format, it is preferable for the display to be sorted from the left to the right of the screen in a top to bottom direction.

Note that a search character string input portion 133 may be displayed on the jukebox program 130. By entering the character string for the required search into the search character string input portion 133 and performing a search, content for which the title, artist name, album name and so on partially match the input character string may be narrowed down for display on the PC content display portion 136. When a search is performed, the table of contents may be narrowed down by a word-matching search (hereinafter sometimes referred to as a "keyword search") and then displayed on the PC content display portion 136, or the table of contents may be narrowed down and displayed on the PC content display portion 136 by performing a search by entering all the words that the user wishes to search.

The jukebox program 130 is used to receive and transfer content between the information processing device 100 and the mobile terminal 200. Next, an example of a screen of the jukebox program 130 will be explained with reference to FIG. 6, when the mobile terminal 200 is connected to the information processing device 100, content stored in the mobile terminal 200 is displayed as a table, and content is transferred between the information processing device 100 and the mobile terminal 200.

FIG. 6 shows the screen displayed on the display portion 112 when the jukebox program 130 is executed when the mobile terminal 200 is connected to the information processing device 100. In FIG. 6, the width of the PC content display portion 136 shown in FIG. 5 is narrower, and a terminal content display portion 138 is separately displayed. Further, a content transfer button 135 is also displayed for the transfer of content between the information processing device 100 and the mobile terminal 200. By selecting the content transfer button 135 by clicking the mouse or the like, the user of the jukebox program 130 can transfer content between the information processing device 100 and the mobile terminal 200.

The terminal content display portion 138 displays the content stored in the mobile terminal 200 (for example, in the flash memory 217) as a table, in which the content is grouped according to content type. The attributes of the mobile terminal 200 content are acquired by the ID information acquisition portion 122. The display of the table of contents stored in the mobile terminal 200 grouped according to content type is performed by the above-described display control portion 124. A column header 139 is also displayed on the terminal content display portion 138, in the same way as the column header 137 for the PC content display portion 136.

As shown in FIG. 6, with the content transfer system according to the first embodiment of the present invention, in the jukebox program 130, the PC content display portion 136 and the terminal content display portion 138 are displayed next to each other on the display portion 112. The user can then use the jukebox program 130 to receive and transfer content between the information processing device 100 and the mobile terminal 200.

Figure 7:
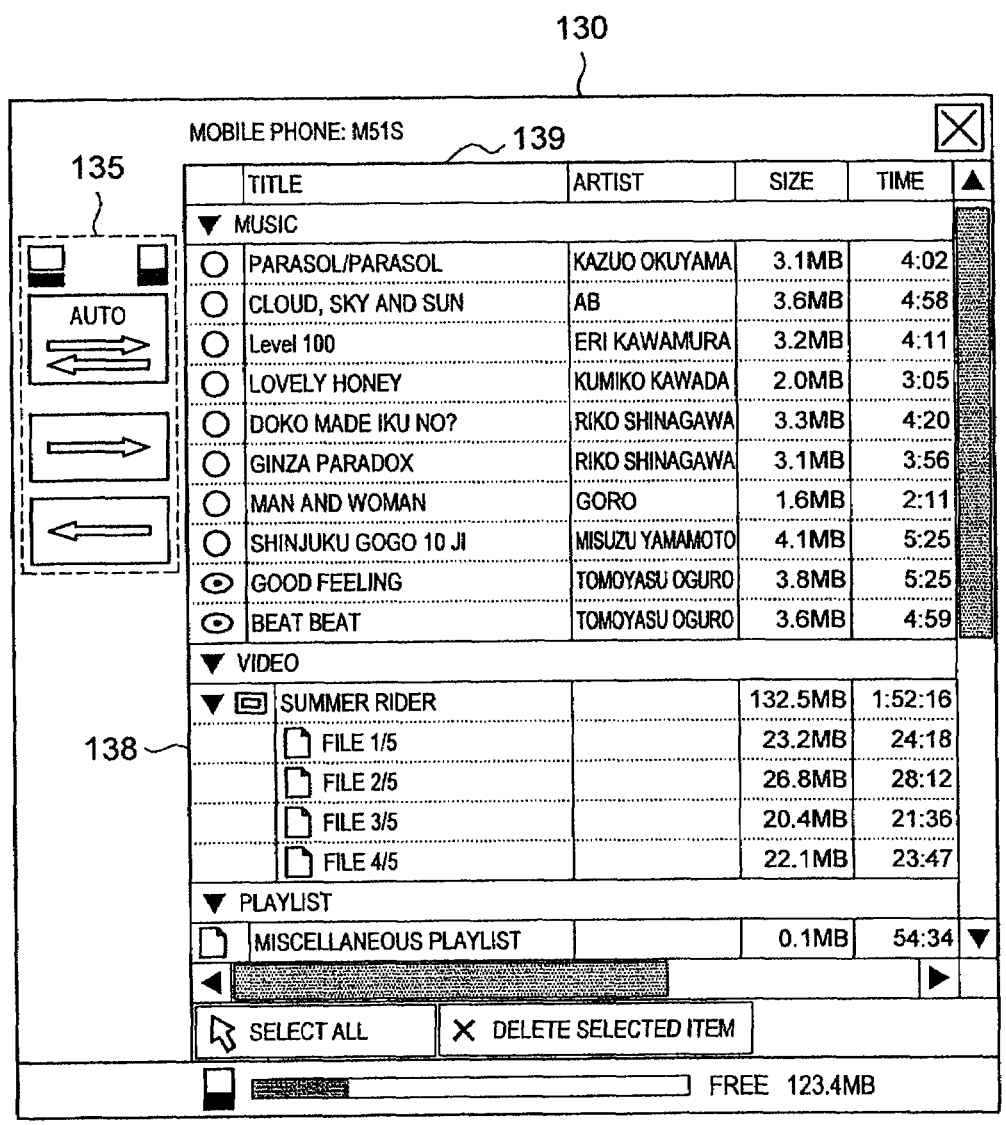
FIG. 7 is an explanatory diagram illustrating a terminal content display portion 138 when it is extracted from a jukebox program 130.

FIG. 7 is an explanatory diagram illustrating the terminal content display portion 138 when it is extracted from the jukebox program 130 screen. As described above, the content stored in the mobile terminal 200 (for example in the flash memory 217) is displayed as a table, grouped according to content type, on the terminal content display portion 138.

Further, the column header 139 is displayed on the terminal content display portion 138, in the same way as the column header 137 on the PC content display portion 136. In the same way as the column header 137, the column header 139 displays the designation of the content attribute of the content displayed as a table on the terminal content display portion 138. In FIG. 6 and FIG. 7, the content attributes displayed are the title, the artist name, the size and the time (playback time). Of course, with the present invention, attributes apart from those shown in FIG. 6 and FIG. 7 may be displayed, and the order of attributes on the column header 139 may be a different order from that shown in FIG. 6 and FIG. 7. Moreover, the order of display of the attributes displayed in the column header 139 may be sorted by operation of the input portion 114 by the user of the information processing device 100, such as, for example, a drag and drop operation using a mouse.

In the same way as the column header 137, the table of contents can be sorted by operating the input portion 114 in relation to the column header 139. The sorting of the table of contents is performed by the above-described sort control portion 126, as for the PC content display portion 136. When sorting the table of contents by performing an operation on the column header 139, sorting is performed while maintaining the display of content grouped according to type on the terminal content display portion 138. For example, when sorting by title, by clicking on the "Title" column on the column header 139, the sort control portion 126 sorts the titles in ascending or descending order on the table of contents for music, video and each playlist respectively.

Figure 8:
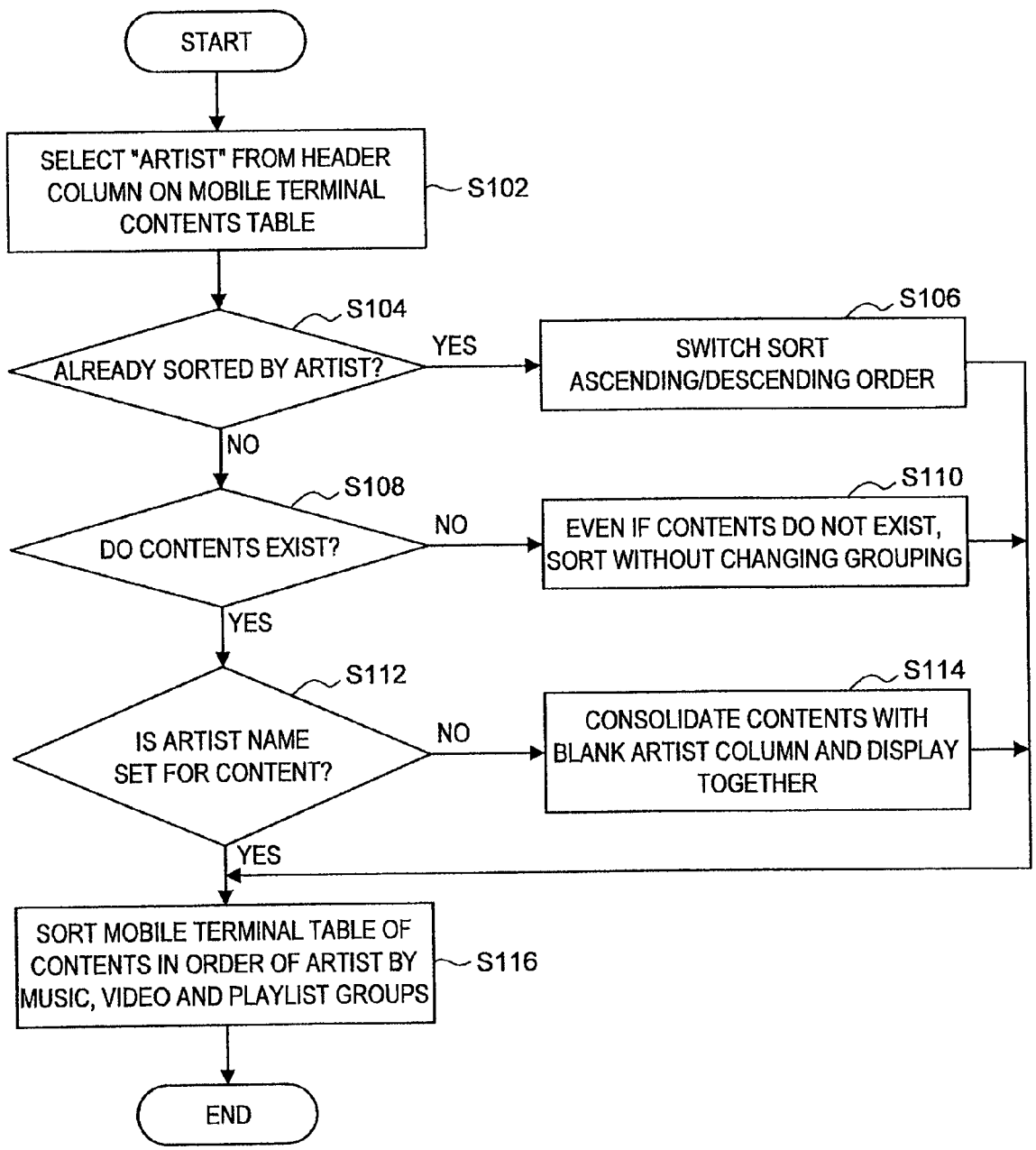
FIG. 8 is a flow chart illustrating a method for sorting a list of contents according to the first embodiment of the present invention.

FIG. 8 is a flow chart illustrating the flow of a table of contents sort method according to the first embodiment of the present invention. Hereinafter, the sort method according to the first embodiment of the present invention will be explained with reference to FIG. 8. Note that, FIG. 8 illustrates sorting of the table of mobile terminal 200 content displayed on the terminal content display portion 138.

First, the "Artist" column on the column header 139 is selected by clicking a mouse or the like (step S102). At this time, the display control portion 124 determines whether or not the terminal content display portion 138 has already been sorted by artist by the sort control portion 126 (step S104). If it is determined that the terminal content display portion 138 has already been sorted by artist by the sort control portion 126, the sort order (ascending order or descending order) is switched (step S106). In other words, if the terminal content display portion 138 has been sorted in ascending order of artist by the sort control portion 126, it is switched to sort in descending order of artist. If however, the terminal content display portion 138 has been sorted in descending order of artist by the sort control portion 126, it is switched to sort in ascending order.

On the other hand, if in step S104 it is determined that the terminal content display portion 138 has not already been sorted by artist by the sort control portion 126, next, the display control portion 124 determines whether or not the relevant content exists in each content type (step S108). Even if there is a content type that does not contain the relevant content, sorting is performed without changing the grouping according to the content type (step S110).

However, if it is determined in step S108 that all the content types contain the relevant content, it is next determined whether or not an artist name has been set for the content (step S112). If there is one or more content for which an artist name has not been set, the display portion 124 performs control such that the content for which the artist column is blank is displayed together (step S114).

Finally, the sort control portion 126 sorts the table of contents stored on the mobile terminal 200 and displayed on the terminal content display portion 138 by artist, for each content type respectively (in the examples shown in FIG. 6 and FIG. 7, this is for music, video and each playlist) (step S116).

Figure 9:
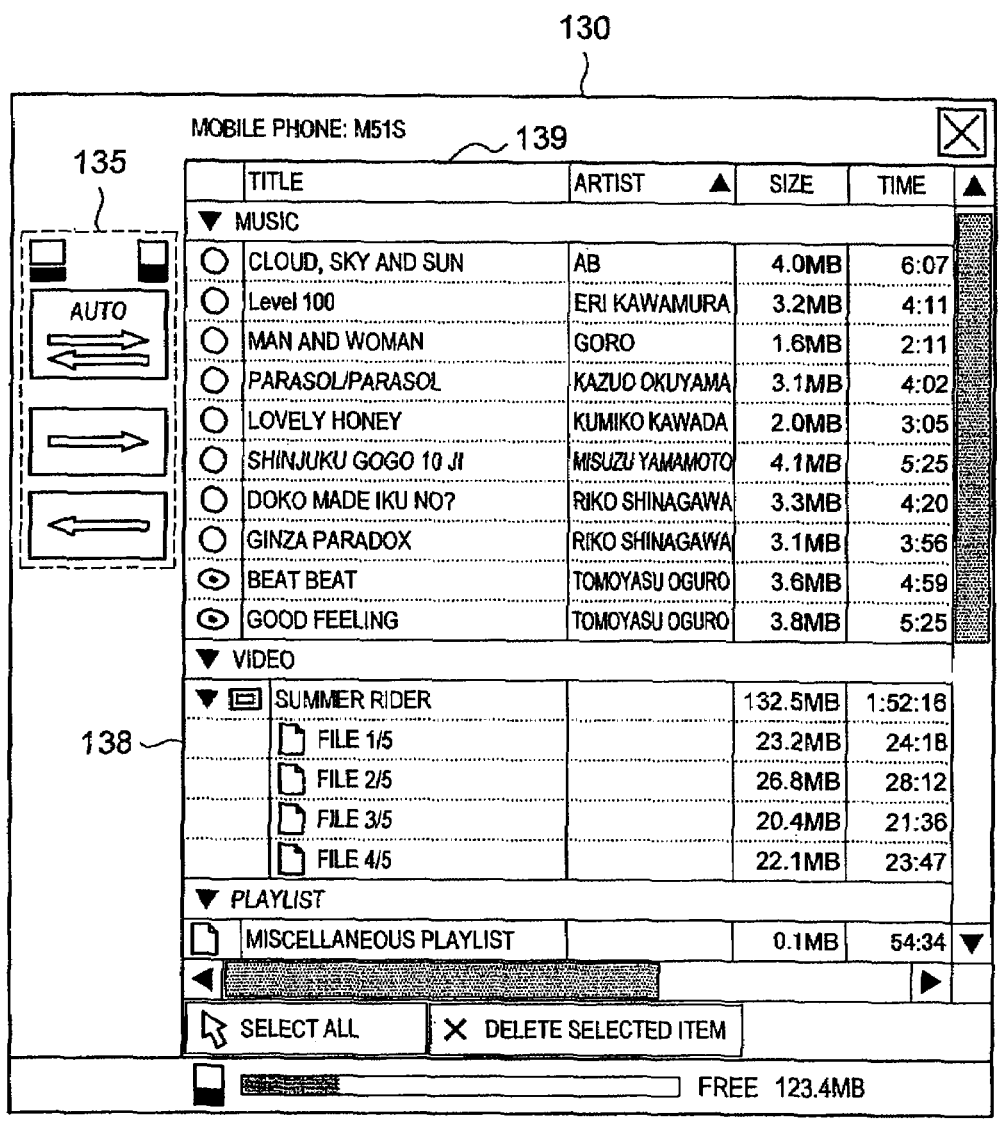
FIG. 9 is an explanatory diagram illustrating a case in which the sorting method according to the first embodiment of the present invention is used to perform sorting in order of artist.

FIG. 9 is an explanatory diagram illustrating a case in which the sorting method according to the first embodiment of the present invention is used to sort, in order of artist, the table of contents displayed on the terminal content display portion 138 shown in FIG. 7. As shown in FIG. 9, when the sorting method according to the first embodiment of the present invention is used to sort the table of contents displayed on the terminal content display portion 138 by artist, the contents are sorted in order of the artist for each content type (here, music, video and each playlist) without changing the grouping according to the content type. Note that, where there is a plurality of content by the same artist, the content may be further sorted in order of the title. The order of sorting may be in ascending order or descending order, and in FIG. 9, when there is a plurality of content by the same artist, the content is further sorted in ascending order of title.

Hereinafter, a modified example of the jukebox program 130 according to the first embodiment of the present invention will be explained with reference to the figures.

Figure 10:
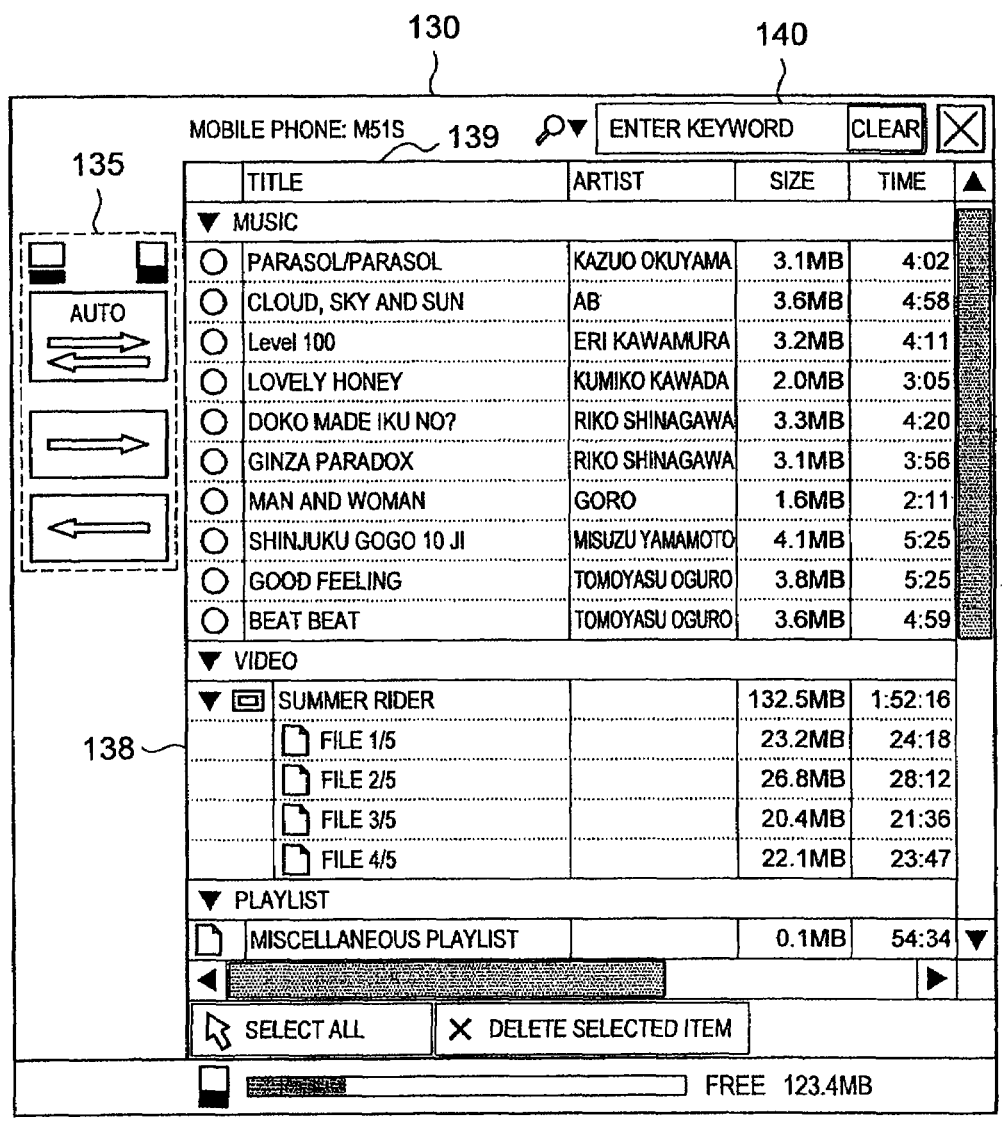
FIG. 10 is an explanatory diagram showing a modified example of the jukebox program according to the first embodiment of the present invention.

FIG. 10 is an explanatory diagram showing a modified example of the jukebox program 130 according to the first embodiment of the present invention. In FIG. 10, a search character string input portion 140 is displayed in the upper section of the terminal content display portion 138 of the jukebox program 130. The search character string input portion 140 initially displays a character string stating "Enter keyword" and when the user enters a character string in the search character string input portion 140, the character string "Enter keyword" displayed on the search character string input portion 140 disappears and the character string entered by the user is displayed. Each time a character string is entered into the search character string input portion 140, the jukebox program 130 searches for contents for which the title, artist name, album name and so on have a partial match (a keyword search), and displays the narrowed down contents on the terminal content display portion 138. The search results are displayed in a state that maintains the grouping according to the content type.

Figure 11:
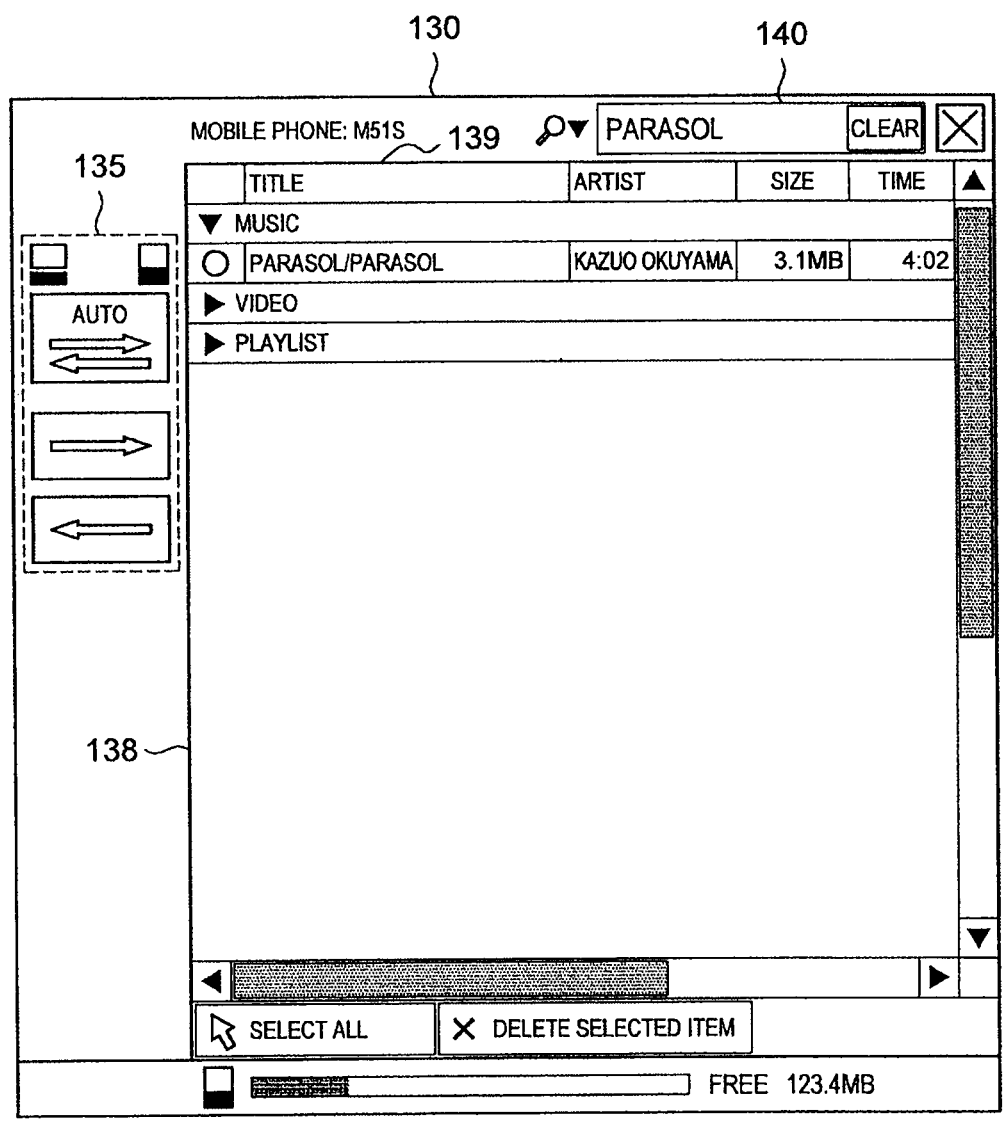
FIG. 11 is an explanatory diagram showing an example of search results in a case in which a keyword search is performed on the jukebox program 130.

FIG. 11 is an explanatory diagram showing an example of search results in a case in which a keyword search is executed on the jukebox program 130 by entering a character string in the search character string input portion 140. In the example shown in FIG. 11, the character string "Parasol" is entered into the search character string input portion 140. In this case, when "Parasol" is entered into the search character string input portion 140, as shown in FIG. 11, the music, video and playlist groupings are maintained, and the contents are narrowed down to the title that has a partial match with "Parasol" and displayed on the terminal content display portion 138.

When searching for contents by a specific artist, if there is an increase in the volume of content, it takes a lot of time and effort to find the desired content by scrolling and sorting. By performing a keyword search, the table of contents is narrowed down to content that has a partial match with the specified keyword, thus allowing easy access to the required content. Moreover, a keyword search is performed to narrow down the table of contents, thus improving user friendliness.

FIG. 12 is an explanatory diagram showing another modified example of the jukebox program 130 according to the first embodiment of the present invention. In FIG. 12, in the "Music" column of the terminal content display portion 138 that displays a list of the contents relating to music, the content is grouped by album and listed as a tree display. In this case also, the lists of content displayed as a tree for each content type may be sorted while maintaining the groupings according to the content type.

For example, if the user of the information processing device 100 selects the "Artist" column on the header column 139 by clicking a mouse or the like, the sort control portion 126 performs sorting by the artist name while maintaining the groupings according to the content type of the content displayed on the terminal content display portion 138. In this case, the content on the terminal content display portion 138 is displayed as a tree grouped by album, and sorting is therefore performed while maintaining the tree display. After sorting has been performed by the artist name, the table of contents is displayed in tree format.

Figure 13:
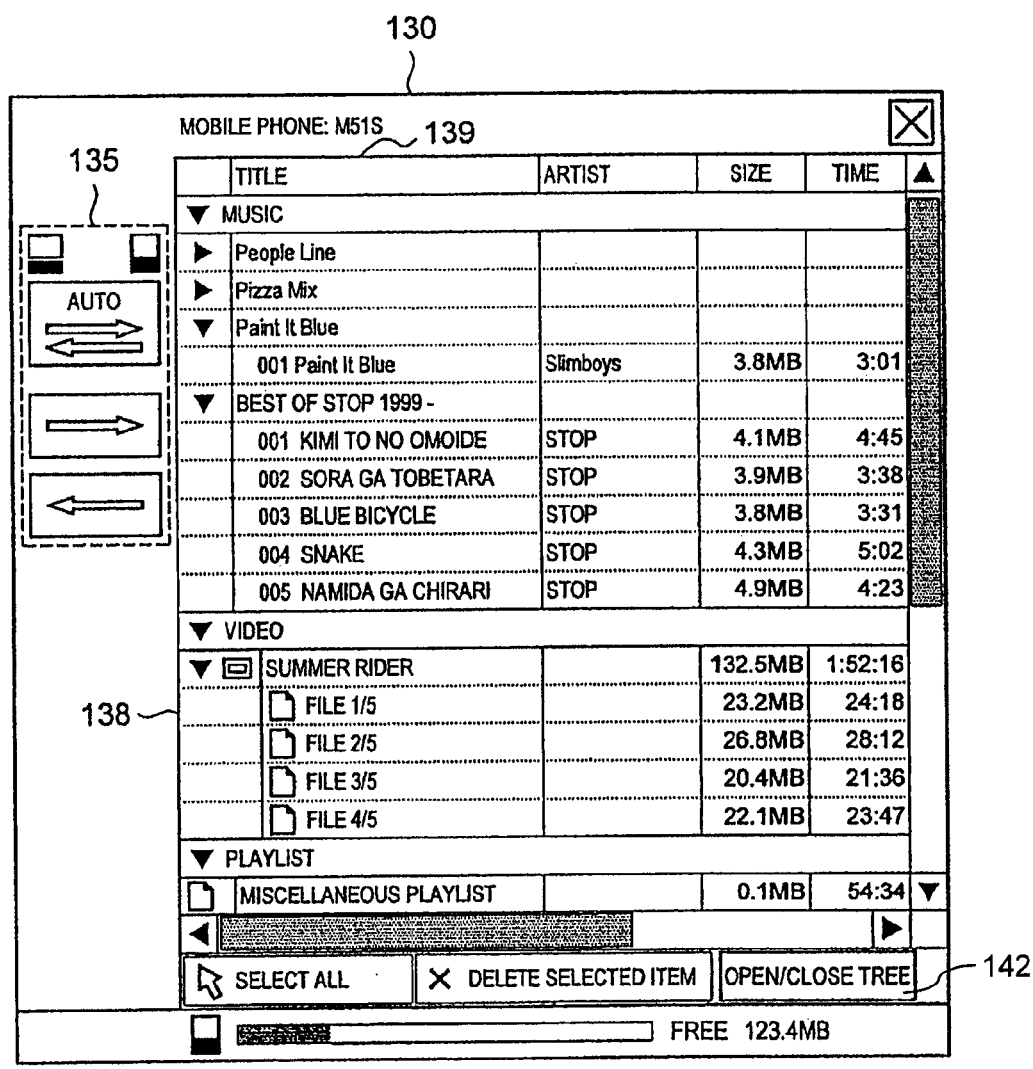
FIG. 13 is an explanatory diagram showing a case in which a tree open/close button is depressed to close all trees before display.

FIG. 13 is an explanatory diagram showing another modified example of the jukebox program 130 according to the first embodiment of the present invention. In FIG. 13, a tree open/close button 142 is displayed in the lower section of the terminal content display portion 138 of the jukebox program 130. When the table of contents on the terminal content display portion 138 is displayed in tree format, the tree open/close button 142 opens and closes all the trees together. Tree display refers to display in which, for example, content is displayed by the same title, the same artist or the same album, with a nested construction.

Figure 14:
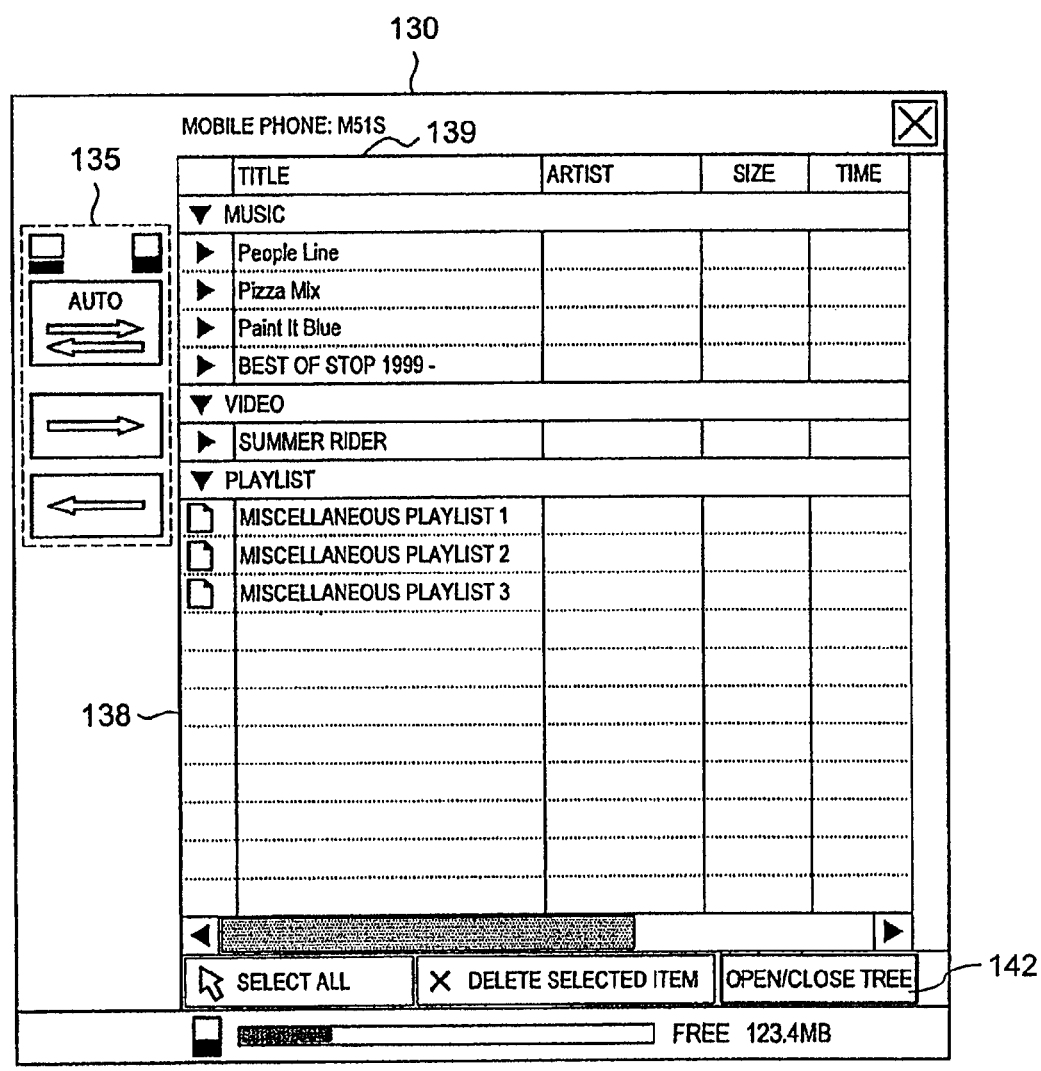
FIG. 14 is an explanatory diagram showing another modified example of the jukebox program according to the first embodiment of the present invention.

FIG. 14 is an explanatory diagram showing a case in which all trees are closed by depressing the tree open/close button 142 by clicking a mouse or the like. In this way, by opening and closing all the trees together, when an increased number of content makes it awkward to close or open albums or videos individually, the concerted opening and closing of trees also improves user friendliness and convenience.

Figure 15:
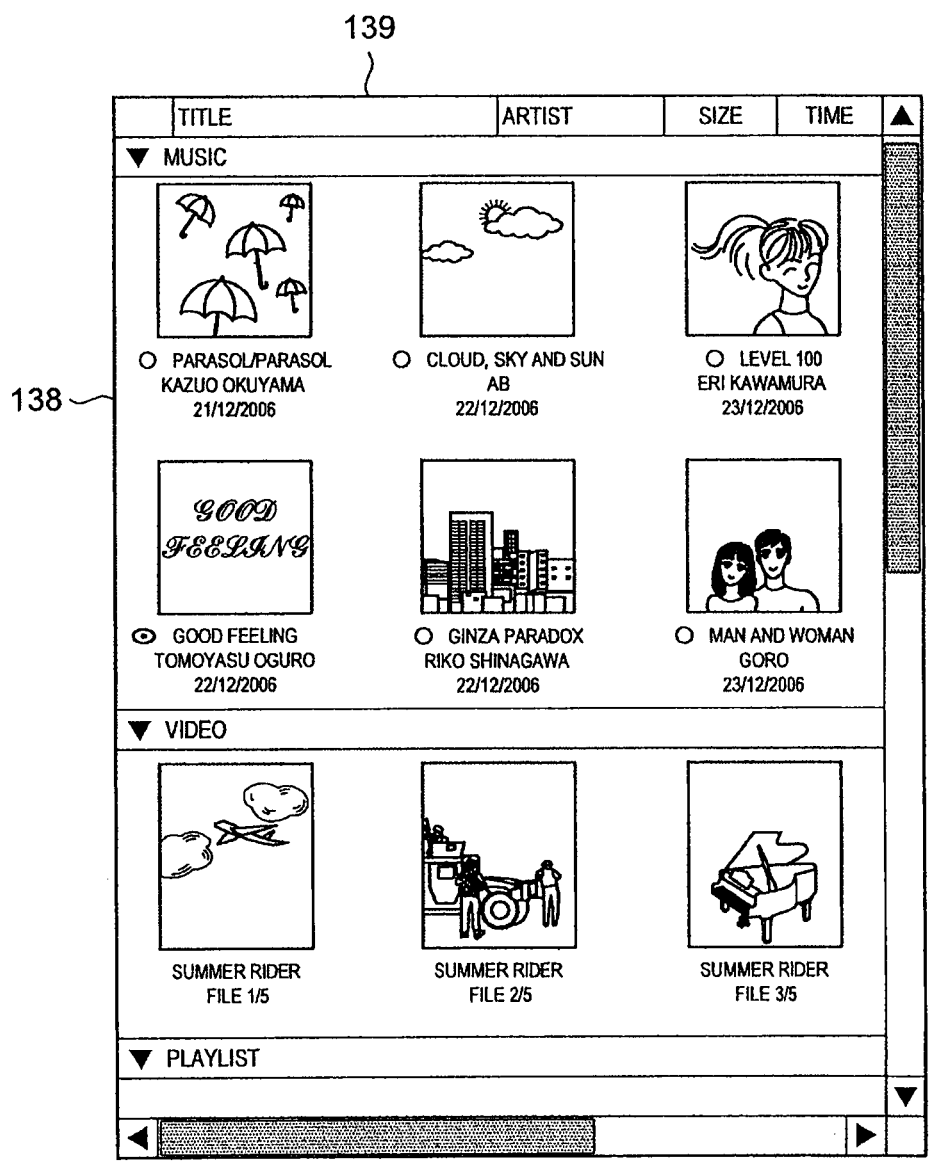
FIG. 15 is an explanatory diagram showing another modified example of the jukebox program according to the first embodiment of the present invention.

FIG. 15 is an explanatory diagram showing another modified example of the jukebox program 130 according to the first embodiment of the present invention. In FIG. 15, in the "Music" column of the terminal content display portion 138 that displays a table of the contents relating to music, and the "Video" column that displays a table of the contents relating to video, the content is shown as thumbnails. In this case also, the table of content displayed as thumbnails for each content type may be sorted while maintaining the groupings according to the content type.

For example, if the user of the information processing device 100 selects the "Title" column on the header column 139 by clicking a mouse or the like, the sort control portion 126 performs sorting by the title name while maintaining the groupings according to the content type of the content displayed on the terminal content display portion 138. In this case, the content on the terminal content display portion 138 is displayed as thumbnails and sorting is therefore performed while maintaining the thumbnail display. After sorting has been performed by the title name, the table of contents is displayed in thumbnail format.

Above, sorting of the table of contents according to the first embodiment of the present invention is explained, including a plurality of modified examples. Note that, in the present embodiment, when sorting the table of contents by specifying content attribute information that is not shared, the content types that do not include the content attribute information may be sorted as a table of contents by other content attribute information. For example, music-related contents have the attribute "Album," but there is no "Album" attribute for video-related contents. Therefore, when the "Album" column is displayed in the column header 139 and the user selects the column header 139 "Album" column to sort the table of contents, the sort control portion 126 may sort the music-related contents according to the album name, but sort the video-related contents according to an attribute other than the album name, such as by the title, for example.

According to the first embodiment of the present invention as described above, when displaying a table of contents that belong to a plurality of content types, the content is displayed in groupings according to the content type. Further, when sorting the table of contents displayed by content type, the content is sorted by each content group while maintaining the groupings according to the content type, so that, even when content is sorted, content from a different type is not mixed in the display, and content is sorted within each of the separate content types. Due to this configuration, the user is able to easily search for a required content. The ease of transfer of content from the information processing device 100 to the mobile terminal 200, of the back up of content from the mobile terminal 200 to the information processing device 100, and of the deletion etc. of content stored on the mobile terminal 200 is also improved.

It should be understood by those skilled in the art that various modifications, combinations, sub-combinations and alterations may occur depending on design requirements and other factors insofar as they are within the scope of the appended claims or the equivalents thereof.

For example, in the above-described embodiment, when the mobile terminal 200 is connected to the information processing device 100, the table of contents stored in the mobile terminal 200 is displayed according to the content type on the jukebox program 130, but the present invention is not limited to this example. For example, when another device is connected to the information processing device 100, information identifying the connected device may be recognized by the information processing device 100, and based on the information, depending on the type of device connected to the information processing device 100, the table of contents may be displayed irrespective of the content type without displaying the table of contents according to each content type. In this case, for example, when a mobile telephone is connected to a personal computer, a table of contents may be displayed according to each content type, and when a portable music playback device that is mainly used to playback music is connected, the table of contents may be displayed without displaying according to the content type.

Further, in the above-described embodiment, the table of contents stored in the mobile terminal 200 is displayed on the in the jukebox program 130 as a display grouped according to the content type, but content stored in the information processing device 100 may also be displayed by grouping according to the content type, and content may be sorted by the content type. By also displaying the table of contents stored in the information processing device 100 by grouping according to the content type, and sorting content by content type, contents can be easily managed.

What is claimed is:

1. An information processing device that performs content transfer with a content recording device on which is stored content that has content identification information identifying the content, the information processing device comprising:
    an identification information acquisition portion that acquires, from the content recording device, the content identification information for the content recorded in the content recording device and device identification information of the content recording device;
    a display control portion that groups a list of the content identification information acquired by the identification information acquisition portion for each of a content type acquired from the content identification information and displays the list when the device identification information indicates a first type of content recording device, the display control portion displaying the list without grouping by content type when the device identification information indicates a second type of content recording device, the display control portion simultaneously displaying a first list of a plurality of content of a first content type in a first content type group and a second list of a plurality of content of a second content type in a second content type group, the first and second lists being displayed separate from each other, the first and second lists being separated by a title of the second list, the title of the second list indicating the second content type, the display control portion displaying an icon with each title of each list, the display control portion displaying or hiding the plurality of content in a corresponding list when the icon is selected by a user, and displaying a second icon separate from each list, the display control portion displaying or hiding the plurality of content in every list while maintaining display of the title of every list when the second icon is selected by the user; and
    a sort control portion, including a processor, that sorts, for each of the content types, each list of the content identification information displayed by the display control portion, based on content attribute information acquired from the content identification information.

2. The information processing device according to claim 1, further comprising:
    a content recording portion that records the content that has the content identification information; wherein the display control portion groups each list of the content recorded in the content recording portion for each of the content types acquired from the content identification information and displays each list.

3. The information processing device according to claim 1, wherein the display control portion receives the device identification information from the content recording device, and, based on the device identification information, determines the contents that are to be displayed for each content type.

4. The information processing device according to claim 1, wherein the display control portion displays content for which the attribute information is the same in groups of attribute information, for at least one of the content types.

5. The information processing device according to claim 1, wherein a display order of each list for each content type displayed by the display control portion can be changed by a drag and drop operation.

6. The information processing device according to claim 1, wherein the sort control portion designates content attribute information that is not shared and, when sorting each content identification information list, sorts any content type that does not have the designated attribute information using other content attribute information.

7. The information processing device according to claim 1, wherein the display control portion instantly displays a list of content identification information for content that has content identification information that partially matches specified conditions.

8. The information processing device according to claim 1, wherein the first type of content recording device is a mobile telephone and the second type of content recording device is a portable music playback device.

9. An information processing method for performing content transfer between a content recording device on which is recorded content that has content identification information identifying the content and an information processing device, the information processing method comprising:
    acquiring, from the content recording device, content identification information for the content recorded in the content recording device and device identification information of the content recording device;
    controlling display, by grouping a list of the content identification information list acquired in the identification information acquiring step for each of a content type acquired from the content identification information and displaying the list when the device identification information indicates a first type of content recording device, the display control portion displaying the list without grouping by content type when the device identification information indicates a second type of content recording device, the controlling including simultaneously displaying a first list of a plurality of content of a first content type in a first content type group and a second list of a plurality of content of a second content type in a second content type group, the first and second lists being displayed separate from each other, the first and second lists being separated by a title of the second list, the title of the second list indicating the second content type, the controlling including displaying an icon with each title of each list, displaying or hiding the plurality of content in a corresponding list when the icon is selected by a user, displaying a second icon separate from each list, and displaying or hiding the plurality of content in every list while maintaining display of the title of every list when the second icon is selected by the user; and sorting by a processor, for each of the content types, each list of content identification information displayed in the controlling display step, based on content attribute information acquired from the content identification information.

10. A content transfer system comprising:
a content recording device on which is stored content that has content identification information identifying the content; and
an information processing device that performs content transfer with the content recording device, wherein the information processing device includes
an identification information acquisition portion that acquires, from the content recording device, the content identification information for the content recorded in the content recording device and device identification information of the content recording device;
a display control portion that groups a list of the content identification information acquired by the identification information acquisition portion for each of a content type acquired from the content identification information and displays the list when the device identification information indicates a first type of content recording device, the display control portion displaying the list without grouping by content type when the device identification information indicates a second type of content recording device, the display control portion simultaneously displaying a first list of a plurality of content of a first content type in a first content type group and a second list of a plurality of content of a second content type in a second content type group, the first and second lists being displayed separate from each other, the first and second lists being separated by a title of the second list, the title of the second list indicating the second content type, the display control portion displaying an icon with each title of each list, the display control portion displaying or hiding the plurality of content in a corresponding list when the icon is selected by a user, and displaying a second icon separate from each list, the display control portion displaying or hiding the plurality of content in every list while maintaining display of the title of every list when the second icon is selected by the user; and
a sort control portion, including a processor, that sorts, for each of the content types, each list of the content identification information displayed by the display control portion, based on content attribute information acquired from the content identification information.

11. A non-transitory computer readable medium encoded with a computer program that performs content transfer with a content recording device on which is stored content that has content identification information identifying the content, the computer program comprising instructions that command a processor to perform a method comprising:
acquiring, from the content recording device, content identification information for the content recorded in the content recording device and device identification information of the content recording device;
controlling display, by grouping a list of the content identification information list acquired in the identification information acquiring step for each of a content type acquired from the content identification information and displaying the list when the device identification information indicates a first type of content recording device, the display control portion displaying the list without grouping by content type when the device identification information indicates a second type of content recording device, the controlling including simultaneously displaying a first list of a plurality of content of a first content type in a first content type group and a second list of a plurality of content of a second content type in a second content type group, the first and second lists being displayed separate from each other, the first and second lists being separated by a title of the second list, the title of the second list indicating the second content type, the controlling including displaying an icon with each title of each list, displaying or hiding the plurality of content in a corresponding list when the icon is selected by a user, displaying a second icon separate from each list, and displaying or hiding the plurality of content in every list while maintaining display of the title of every list when the second icon is selected by the user; and
sorting by the processor, for each of the content types, each content identification information list displayed in the controlling display step, based on content attribute information acquired from the content identification information.

* * * * *